United States Patent Office 3,412,098
Patented Nov. 19, 1968

3,412,098
SUBSTITUTED N-PHENYL-N'-PYRIDYLETHYL-PHENYL THIOUREAS
Erhardt Winkelmann, Kelkheim, Taunus, and Wolf-Helmut Wagner, Frankfurt am Main, Germany, assignors to Farbwerke Hoechst Aktiengesellschaft vormals Meister Lucius & Bruning, Frankfurt am Main, Germany, a corporation of Germany
No Drawing. Filed Nov. 2, 1965, Ser. No. 506,116
Claims priority, application Germany, Nov. 6, 1964,
F 44,382
7 Claims. (Cl. 260—294.8)

ABSTRACT OF THE DISCLOSURE

N-phenyl-N'-pyridylethylphenyl thioureas that are substituted in the N-phenyl moiety by alkyl, alkoxy, or cycloalkyl groups. These compounds are effective against tuberculosis and leprosy.

---

The present invention relates to new tuberculostatically active thioureas corresponding to the general Formula I

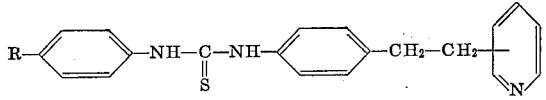

wherein R represents a straight-chained or a ramified alkyl or alkoxy group having 4 to 6 carbon atoms or a cycloalkyl group having 5 to 6 carbon atoms and the pyridyl group in α-, β- or γ-position may be linked to the ethylene group. This compound may be obtained (a) by reacting isothiocyanates of the general formula

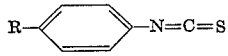

wherein R has the meaning given above or by reacting compounds which—in the course of the reaction—react like said isothiocyanates, with substituted anilines of the general formula

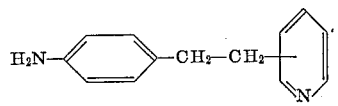

or (b) by reacting isothiocyanates of the general formula

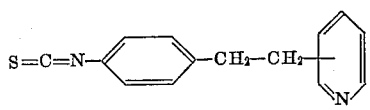

or by reacting compounds which—in the course of the reaction—react like said isothiocyanates, with substituted anilines of the general formula

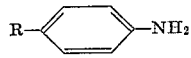

wherein R has the meaning given above.

As substituted isothiocyanates mentioned sub (a) as starting substances according to the method of the present invention, there are used, for instance, phenyl-isothiocyanates carrying an alkyl radical in para-position, such as 4-butyl-phenyl-isothiocyanate, 4-isobutyl-phenyl-isothiocyanate, 4-amyl-phenyl-isothiocyanate, 4-isoamyl-phenyliso-thiocyanate, 4-hexyl-phenyl-isothiocyanate, likewise 4-cyclopentyl-phenyl-isothiocyanate and 4 - cyclohexylphenyl-isothiocyanate. A special advantage is given by the substitution in para-position of the phenyl-isothiocyanate radical of the para-position with an alkoxy group. Of these starting substances there are mentioned, for instance, 4-butyloxy-phenyl-isothiocyanate, 4 - isobutyloxy-phenyl-isothiocyanate, 4-amyloxy-phenyl-isothiocyanate, 4 - isoamyloxy-phenyl-isothiocyanate, or 4-hexyloxy-phenyl-isothiocyanate.

In accordance with the method mentioned sub (b), pyridyl-ethyl-phenyl-isothiocyanates are reacted with the correspondingly substituted anilines, for instance, with 4-butylaniline, 4-isobutyl-aniline, 4-amylaniline, 4-isoamyl-aniline, 4-hexyl-aniline, 4-cyclopentyl-aniline, or 4-cyclohexyl-aniline. The use of 4-butyloxy-aniline, 4-isobutyl-oxy-aniline, 4-amyloxy-aniline, 4-isoamyloxy-aniline or 4-hexyloxy-aniline is likewise of special advantage.

Instead of the isothiocyanates there can likewise be used for the reaction compounds usually known as isothiocyanate formers which in the course of the reaction react like said isothiocyanates, for instance, the corresponding dithiocarbamic acid salts, thiocarbamic acid halides, thiocarbamic acid esters, dithiocarbamic acid esters and thioureas.

The process of the present invention is advantageously carried out by reacting the components in equimolar amounts. The compounds may be reacted by simply heating them, but, in general, it is recommended simultaneously to use a solvent or a distributing agent; it being of advantage to use an organic solvent in 5 to 20 times the amount of the reactants. As solvents, there are preferably used low-molecular alcohols, preferably methanol and ethanol, or ethers, especially diethyl-ether, aromatic hydrocarbons, preferably benzene and toluene. The reaction temperature may vary between room temperature and 150° C. It is suitable to operate at the boiling temperature of the solvent used. According to the reaction conditions and temperatures applied, the reaction periods are comprised between a few minutes and several hours. Generally, the desired products crystallize out already upon cooling of the reaction mixture and may be recrystallized, if desired, from appropriate solvents. The substituted isothiocyanates serving as starting substances for the process described sub (a) as well as the substituted anilines used according to (b) and corresponding to the general formula

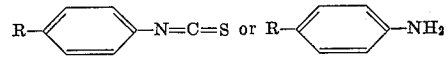

are known.

The substituted anilines of the general formula

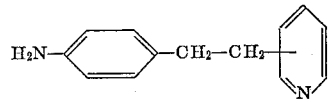

can be produced by reduction of the condensation products of p-nitrobenzaldehyde with α-, β- or γ-picoline. The condensation is carried out in the usual manner by using a condensing agent such, for instance, as acetic acid anhydride. The corresponding pyridyl-ethyl-phenyl-isothiocyanates are advantageously produced by reacting the substituted anilines used as starting products with carbon disulfide and concentrated aqueous ammonia and oxidizing the ammonium salts of the dithiocarbamic acids formed in the first stage with the sodium chlorite.

The novel products obtained according to the process of the present invention are valuable medicaments, which, while being well tolerated on oral application, show tuberculostatic action as shown by in vivo tests in mice and Guinea pigs. The thioureas may likewise be applied cutaneously in the form of liquids or ointments to be rubbed into the skin in cases of tuberculosis and leprosy. For this purpose, the products of the invention are advantageously dissolved in appropriate solvents such, for instance, as ethyleneglycol-monoalkyl ether and ethylene-glycol-monoalkyl-ester, glycerine-monoalkyl ester and glycerine-dialkyl ester, glycolic acid alkyl ester, dimethyl-formamide, and applied in concentrations of 0.1 to 50%, or they are used in the form of ointments with appropriate solubilizers such, for instance, as stearic acid diethanolamide. Tests with rats strongly infected with *Microsporum lepraemurium* showed that after painting the lepromata with thioureas in solutions of a concentration of 1 to 10% in an organic solvent, the histologically and macroscopically ascertainable findings diminished. Therefore, the thioureas can likewise be used as medicaments in the treatment of lepromata if applied locally.

It is already known that certain substituted N,N'-diarylthioureas, for instance, the N-(p-isobutyloxy-phenyl)-N'-[p-(2-α-pyridyl-vinyl)-phenyl]-thiourea (cf. U.S. Patent No. 2,949,459 and Belgian Patent No. 585,110) and the N-(p-n-butyloxy-phenyl)-N' - [p - (γ - pyridylmethyl)-phenyl]-thiourea [cf. J. Am. Chem. Soc. 80 (1958), page 2203] show tuberculostatic properties.

The products obtained according to the present invention are, however, distinctly superior to the known products. For instance, the N-p-isobutoxyphenyl-N'-[p-(α-pyridylethyl)-phenyl]-thiourea (in the following named compound I) in comparison with the known N-(p-isobutoxyphenyl)-N'-[p-(γ-pyridylmethyl)-phenyl] - thiourea (compound II) and the N-[p-(n-butoxy-phenyl)]-N'-[p-(γ-pyridylmethyl)-phenyl] - thiourea (compound III) as regards the prolongation of life attained and the total findings of the organ.

Comparable tests between the product I obtained by the process of the present invention and the known compounds II and III showed that with concentrations in which compound I already shows a very good action, the known compounds II and III are not at all active. (Cf. pages 6 and 7 Table 1.) Furthermore, the products obtained according to the process of the present invention in comparison with known compounds such, for instance, as N-(p-isobutyloxy-phenyl)-N'-[p-(2-α-pyridyl-vinyl)-phenyl]-thiourea, show a considerably raised tolerability, i.e. a reduced toxicity. The latter refers, in particular, to the chronic toxicity (cf. pages 6/7). The products of the invention are likewise superior to the known medicaments applied in the therapy of tuberculosis, i.e. isonicotinic acid hydrazide (INH). In order to arrive at the same curative effect, product I is needed in a quantity which is 10 times higher than that required for the known INH. The acute tolerability of I is, however, at least 25 times as high as that of INH (cf. pages 8/9). Comparison of N-(p-isobutoxyphenyl)-N'-[p-(α-pyridylether)-phenyl]-thiourea (I) with N-(p-isobutoxyphenyl)-N'-[p-(γ-pyridylmethyl) - phenyl] - thiourea (II) and N-(p-n-butoxyphenyl)-N'-[p' - (γ - pyridylmethyl)-phenyl]-thiourea (III).

TEST ARRANGEMENT

A collective of mice of equal breeding, age and conditions of living were so strongly infected with the bovine tuberculosis bacterium strain Ravenel that the infected control animals died from pulmonary tuberculosis after 28.6 days on an average. The collective was divided into 5 groups of 10 animals each; one group remained untreated (control animals), the others were given each 15 times on successive days the preparations enumerated in Table I in the corresponding dose by means of the esophageal sound. Each animal that died during the test period and the animals sacrificed at the end of the test period were dissected; upon macroscopic examination, the pulmonary findings were indicated according to the degree of intensity, by the FIGURES 0–4 (pathological findings). In order to render possible a therapeutical comparison, the average time of survival of the treated animals was brought into relation to that of the control animals whereby the average pathological findings in the lungs were determined. The quotient thereof was designated as value of activity.

TABLE I

| Substance | Dose,[1] mg./kg. orally applied | Average period of survival/average pathological findings in lungs | Value of activity |
|---|---|---|---|
| I | 25 | 26.7/1.4 | 19.0 |
|   | 50 | 26.9/1.22 | 22.0 |
|   | 100 | 25.4/0.9 | 28.2 |
| II | 25 | 20.8/3.85 | 5.4 |
|   | 50 | 10.3/3.65 | 5.6 |
|   | 100 | 21.0/3.0 | 7.0 |
| III | 25 | 20.8/3.45 | 6.0 |
|   | 50 | 21.2/3.45 | 6.1 |
|   | 100 | 21.9/2.3 | 9.5 |
| Control | | 18.5/3.75 | 4.94 |

[1] Daily dose given on 15 successive days.

TOLERABILITY TESTS IN RATS

Several male and female rats were given N-[p-isobutoxy-phenyl]-N'-[p-(α-pyridylethyl) - phenyl]-thiourea (I) every day for 1 year by means of the esophageal sound; the dose amounted to 100 or 500 mg./kg. respectively. The histological examination of the animals killed at the end of the test period showed that all livers and kidneys were free from pathological modifications. The histological findings in these animals were equal to those of the control animals kept under equal test conditions but not treated with the N-(p-isobutoxy-phenyl)-N'-[p-(α-pyridylethyl)-phenyl]-thiourea (I). A comparison test showed that rats which were given the known N-(p-isobutoxy-phenyl) - N' - [p - (α - pyridyl-vinyl)-phenyl]-thiourea (IV) in a dose of 500 mg./kg. for 1 year by means of the esophageal sound, all other conditions unchanged, showed distinct pathological modifications in liver and kidneys, such as fatty degenerations, modifications of the cell nuclei in the sense of a polymorphy as well as storages in the liver.

The kidneys showed, in particular, damages in the epithelium with destructions of the cells, above all in the sphere of the descenting parts of the Henle's loops.

When comparing N-(p-isobutoxy - phenyl)-N'-[p-α-pyridylethyl-phenyl]-thiourea (I) with isonicotinic acid hydrazide (INH) the following results were obtained (arranged according to Table I, pages 6 and 7).

TABLE 2

| Substance | Dose[1] mg./kg. orally | Average period of survival/average pathological findings in lungs | Value of activity |
|---|---|---|---|
| INH | 10 | 42.0/1.35 | 31.1 |
| I | 25 | 39.6/3.0 | 13.2 |
| I | 50 | 40.8/1.8 | 22.6 |
| I | 100 | 42.0/1.1 | 38.2 |
| Control | | 28.6/3.7 | 7.7 |

[1] Daily dose given on 15 successive days.

The results contained in Table 2 show that the action of compound I is superior to the action attained with the known compound INH, if I is given in a dose 10 times higher than that of INH.

When determining the therapeutical value, not only the curative effect but likewise the tolerability must be taken into consideration. If compound I is given once to mice by means of the esophageal sound, no toxicity can be detected, even if doses of 5.0 g./kg. are given. The $LD_{50}$ of INH, determined by calculation with a large collective of mice according to the method of the smallest squares (Prigge und Schäfer, Naumyn-Schmiedeberg's Arch. exp. Pathol. Pharmakol. 191:281, 1939; Wagner und Schulz, Z.f.d. ges. exp. Med. 119:204, 1952) amounts to 209 mg./kg. per os.

In a quantitative curative test there was determined as $DC_{50}$ for INH a dose of 3.70 mg./kg. and for compound I a dose of 33.50 mg./kg. These figures were ascertained by taking as a base the number of surviving animals of the 35th day of the test period (method of Wagner, Beitr. Klin.Tuberk.113: 409, 1955).

A therapeutic index $LD_{50}$ cannot precisely be determined since the value of acute toxicity in mice cannot be ascertained exactly as regards substance I.

It results, however, from the above-mentioned curative tests that in order to arrive at a curative effect, substance I has to be applied in 10 times higher a dose than substance INH. The tolerability of substance I is, however, at least 25 times higher than that of substance INH. This means, that in the case of tuberculosis in mice the chemotherapeutical index compound I is higher than that of compound INH.

In the tests in mice and Guina pigs the products obtained according to Examples 1 and 3–7 likewise show the same tuberculostatic effect as the product obtained according to Example 2.

For the local treatment of leprous regions, thioureas can be applied dissolved in organic solvents and in corresponding preparations at a concentration of 0.5 to 10% strength.

The following examples serve to illustrate the invention but they are not intended to limit it thereto.

Example 1

(a) N-(p-n-butoxy-phenyl) - N' - [p-(α-pyridyl-ethyl)-phenyl]-thiourea.—19.8 grams (0.1 mol.) of p-α-pyridyl-ethyl-aniline are dissolved in 100 cc. of ethanol and 20.7 grams (0.1 mol.) of p-n-butoxy-phenyl-isothiocyanate is added. The reaction mixture is heated for 15 minutes on the steam bath to 75° C. or it is allowed to stand for several hours at room temperature. After some time, the compound crystallizes out, it is filtered off with suction, washed with a small amount of ice-cold ethanol and recrystallized from ethanol. 33 grams (82% of the theory) of N-(p-n-butoxyphenyl) - N' - [α-pyridyl-ethyl-phenyl]-thiourea are obtained in the form of a finely crystallized powder which melts at 140° C.

(b) The N-(p-n-butoxy-phenyl-N'-[p-(α-pyridylethyl)-phenyl]-thiourea can likewise be prepared by heating 16.5 grams (0.1 mol.) of p-n-butoxy-aniline together with 24.0 grams (0.1 mol.) of p-α-pyridylethyl-phenyl-isocyanate dissolved in 100 cc. of ethanol for 15 minutes to 75° C., or by abandoning the reaction mixture at room temperature and working it up as described above.

The p-α-pyridylethyl-aniline is obtained by condensation of p-nitrobenzaldehyde with α-picoline in acetic acid anhydride by heating for 6 hours with reflux and subsequent reduction of the condensation product by means of Raney nickel in alcoholic solution. Upon elimination of the catalyst and of the solvent after the hydrogenation, the p-α-pyridylethylaniline obtained in the form of an oily residue is directly used. (Boiling point 156–158° C., melting point 56° C.)

The p-α-pyridylethylphenyl-isothiocyanate used as starting substance according to the method described sub (b) is prepared by reacting p-α-pyridylethylaniline with carbon disulfide and concentrated aqueous ammonia, and the ammonium salt obtained in each case of the corresponding dithiocarbamic acid is oxidized with sodium chlorite.

In the same manner the following thioureas can be prepared:

| | Yield in percent of the theory | Melting point, ° C. |
|---|---|---|
| (2) N-(p-isobutoxy-phenyl)-N'-[p-(α-pyridylethyl)-phenyl]-thiourea | 85 | 115 |
| (3) N-(p-isoamoxy-phenyl)-N'-[p-α-pyridylethyl)-phenyl]-thiourea | 80 | 141 |
| (4) N-(p-isobutoxy-phenyl)-N'-[p-γ-pyridylethyl)-phenyl]-thiourea | 74 | 134 |
| (5) N-(p-isoamyl-phenyl)-N'-[p-(α-pyridylethyl)-phenyl]-thiourea | 68 | 124 |
| (6) N-(p-cyclopentyl-phenyl)-N'-[p-α-pyridylethyl)-phenyl]-thiourea | 72 | 127 |
| (7) N-(p-cyclohexyl-phenyl)-N'-[p-(α-pyridylethyl)-phenyl]-thiourea | 91 | 139 |

The p-α-pyridylethyl-aniline is obtained as described in Example 1 by condensation of p-nitrobenzaldehyde with α-picoline.

We claim:
1. Compounds of the general formula

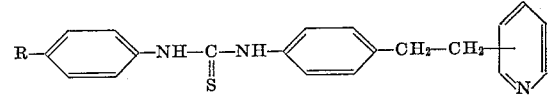

wherein R is a member selected from the group consisting of straight chain and branched alkyl and alkoxy having from 4 to 6 carbon atoms and cycloalkyl having from 5 to 6 carbon atoms.

2. N - (p-n-butoxy-phenyl) - N' - [p-(α-pyridylethyl)-phenyl]-thiourea.

3. N - (p-isobutoxy-phenyl) - N' - [p-(α-pyridylethyl)-phenyl]-thiourea.

4. N - (p-isoamoxy-phenyl) - N' - [p-(α-pyridylethyl)-phenyl]-thiourea.

5. N - (p-isoamyl-phenyl) - N' - [p-(α-pyridylethyl)-phenyl]-thiourea.

6. N-(p-cyclopentyl-phenyl) - N' - [p-(α-pyridylethyl)-phenyl]-thiourea.

7. N-(p-cyclohexyl-phenyl) - N' - [p-(α-pyridylethyl)-phenyl]-thiourea.

References Cited

UNITED STATES PATENTS 2,820,039  1/1958  Doub et al. _____ 260—294.8
2,923,812  2/1960  Mizzoni _____ 260—294.8

HENRY R. JILES, Primary Examiner.

AL ROTMAN, Assistant Examiner.